(12) United States Patent
Yaguchi et al.

(10) Patent No.: US 9,254,834 B2
(45) Date of Patent: *Feb. 9, 2016

(54) VEHICLE AND CONTROL METHOD FOR VEHICLE

(75) Inventors: Hideaki Yaguchi, Toyota (JP); Takeshi Hoshiba, Anjo (JP); Akihiro Kimura, Toyota (JP); Masahiro Naito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/978,762

(22) PCT Filed: Jan. 27, 2011

(86) PCT No.: PCT/JP2011/051557
§ 371 (c)(1),
(2), (4) Date: Jul. 9, 2013

(87) PCT Pub. No.: WO2012/101796
PCT Pub. Date: Aug. 2, 2012

(65) Prior Publication Data
US 2013/0297131 A1 Nov. 7, 2013

(51) Int. Cl.
*B60W 20/00* (2006.01)
*B60K 6/445* (2007.10)
(Continued)

(52) U.S. Cl.
CPC .............. *B60W 20/00* (2013.01); *B60K 6/445* (2013.01); *B60W 10/06* (2013.01); *B60W 10/08* (2013.01);
(Continued)

(58) Field of Classification Search
CPC ....... B60K 6/445; B60K 6/365; B60W 10/08; B60W 10/06; B60W 2710/083; B60W 20/00; B60W 2600/00; B60W 2710/0644; B60W 2710/105; Y02T 10/6239; Y02T 10/6286; Y02T 10/7077; B60L 11/14; B60L 2240/423; B60L 2240/486; G06F 1/3203; G06F 1/3287; Y02B 60/1282; Y02B 60/32; Y10S 903/93
USPC ............ 701/22, 54, 110; 713/323; 73/114.41; 324/764.01; 358/1.14
See application file for complete search history.

(56) References Cited

U.S. PATENT DOCUMENTS

| | | |
|---|---|---|
| 6,020,696 A | 2/2000 | Matsunaga et al. |
| 6,488,107 B1 | 12/2002 | Ochiai et al. |

(Continued)

FOREIGN PATENT DOCUMENTS

| | | |
|---|---|---|
| CN | 101386302 A | 3/2009 |
| DE | 102008042409 A1 | 4/2009 |

(Continued)

OTHER PUBLICATIONS

Mar. 17, 2015 Notice of Allowance issued in U.S. Appl. No. 13/976,592.

(Continued)

*Primary Examiner* — James Trammell
*Assistant Examiner* — Sanjeev Malhotra
(74) *Attorney, Agent, or Firm* — Oliff PLC

(57) ABSTRACT

An ECU executes a program including the steps of: executing fuel-cut control when an IG OFF operation has been performed and a vehicle is traveling; determining torque command values of a first MG and a second MG when a charge power upper limit value Win is reduced; controlling the first MG based on the determined torque command value of the first MG; and controlling the second MG based on the determined torque command value of the second MG.

17 Claims, 4 Drawing Sheets

(51) Int. Cl.
*B60W 10/06* (2006.01)
*B60W 10/08* (2006.01)
*B60W 10/26* (2006.01)

(52) U.S. Cl.
CPC ............... *B60W 10/26* (2013.01); *B60W 20/40* (2013.01); *B60W 2510/083* (2013.01); *B60W 2510/244* (2013.01); *B60W 2710/083* (2013.01); *B60W 2710/086* (2013.01); *Y02T 10/6239* (2013.01); *Y02T 10/6286* (2013.01); *Y10S 903/93* (2013.01)

(56) References Cited

U.S. PATENT DOCUMENTS

| | | | |
|---|---|---|---|
| 6,961,646 B2 | 11/2005 | Soliman et al. | |
| 7,219,757 B2 | 5/2007 | Tomita et al. | |
| 7,238,133 B2 | 7/2007 | Tabata et al. | |
| 7,722,498 B2 | 5/2010 | Kawasaki et al. | |
| 7,950,485 B2 | 5/2011 | Fukumura | |
| 8,192,327 B2 | 6/2012 | Gibson et al. | |
| 2001/0027370 A1 | 10/2001 | Tamura et al. | |
| 2002/0115516 A1 | 8/2002 | Kawabata et al. | |
| 2003/0019286 A1* | 1/2003 | Wakahara | F02M 25/0809 73/114.41 |
| 2005/0055152 A1* | 3/2005 | Wakashiro | B60K 6/485 701/110 |
| 2005/0209044 A1 | 9/2005 | Imazu et al. | |
| 2007/0275819 A1 | 11/2007 | Hirata | |
| 2008/0098246 A1* | 4/2008 | Kim | G06F 1/3203 713/323 |
| 2008/0109142 A1* | 5/2008 | Endo | B60K 6/445 701/54 |
| 2008/0275625 A1 | 11/2008 | Snyder | |
| 2009/0076693 A1 | 3/2009 | Kumazaki et al. | |
| 2009/0088291 A1 | 4/2009 | Kumazaki et al. | |
| 2009/0101428 A1 | 4/2009 | Itoh | |
| 2009/0120701 A1 | 5/2009 | Taguchi et al. | |
| 2009/0143950 A1 | 6/2009 | Hasegawa et al. | |
| 2009/0236159 A1 | 9/2009 | Shibata et al. | |
| 2009/0299559 A1* | 12/2009 | Shimohira | B60K 1/02 701/22 |
| 2010/0030412 A1 | 2/2010 | Mitsutani | |
| 2010/0160111 A1 | 6/2010 | Yamanaka et al. | |
| 2010/0244886 A1* | 9/2010 | Kawahara | G01R 31/361 324/764.01 |
| 2010/0262322 A1 | 10/2010 | Yokouchi et al. | |
| 2011/0263379 A1 | 10/2011 | Liang et al. | |
| 2011/0314316 A1* | 12/2011 | Kim | G06F 1/3203 713/323 |
| 2012/0162693 A1* | 6/2012 | Ito | G06K 15/4095 358/1.14 |
| 2012/0203414 A1 | 8/2012 | Akutsu et al. | |
| 2013/0253749 A1* | 9/2013 | Hayashi | B60W 20/102 701/22 |
| 2013/0261866 A1* | 10/2013 | Hoshiba | F02D 29/02 701/22 |
| 2013/0297132 A1 | 11/2013 | Yaguchi et al. | |

FOREIGN PATENT DOCUMENTS

| | | |
|---|---|---|
| DE | 112008001444 T5 | 4/2010 |
| EP | 2657097 A1 | 10/2013 |
| JP | H10-174212 A | 6/1998 |
| JP | H10-257604 A | 9/1998 |
| JP | 2000-257460 A | 9/2000 |
| JP | A 2001-65385 | 3/2001 |
| JP | 2004-092623 A | 3/2004 |
| JP | 2005-233252 A | 9/2005 |
| JP | A-2005-261041 | 9/2005 |
| JP | A-2007-23919 | 2/2007 |
| JP | A-2007-216833 | 8/2007 |
| JP | 2007-263020 A | 10/2007 |
| JP | A 2008-190495 | 8/2008 |
| JP | 2009-067257 A | 4/2009 |
| JP | A 2009-149116 | 7/2009 |
| JP | A-2009-280176 | 12/2009 |

OTHER PUBLICATIONS

Jul. 17, 2014 Office Action issued in U.S. Appl. No. 13/976,592.
Oct. 22, 2014 Office Action issued in U.S. Appl. No. 13/976,592.
Feb. 2, 2015 Advisory Action issued in U.S. Appl. No. 13/976,592.
Apr. 2, 2015 Office Action issued in U.S. Appl. No. 13/978,975.
U.S. Appl. No. 13/978,975, filed Jul. 10, 2013 in the name of Yaguchi et al.
May 1, 2015 Corrected Notice of Allowability issued in U.S. Appl. No. 13/976,592.
Aug. 17, 2015 Notice of Allowance issued in U.S. Appl. No. 13/978,975.
Sep. 1, 2015 Corrected Notice of Allowability issued in U.S. Appl. No. 13/978,975.
Nov. 17, 2015 Corrected Notice of Allowability issued in U.S. Appl. No. 13/978,975.

* cited by examiner

VEHICLE AND CONTROL METHOD FOR VEHICLE

TECHNICAL FIELD

The present invention relates to control of a vehicle having a rotating electric machine and an internal combustion engine.

BACKGROUND ART

Japanese Patent Laying-Open No. 2007-23919 (PTD 1) discloses an engine start control system disclosing a technique of restarting an engine when a push switch is pushed even if a brake pedal is not depressed if the engine has stopped due to some cause while a vehicle is traveling.

In addition, in recent years, as one of the countermeasures against environmental problems, hybrid vehicles equipped with a motor generator and an engine have received attention. A publicly known example of such a hybrid vehicle is a vehicle with elements: drive wheels, an engine, and a motor generator which are mechanically coupled together.

CITATION LIST

Patent Document

PTD 1: Japanese Patent Laying-Open No. 2007-23919

SUMMARY OF INVENTION

Technical Problem

In the hybrid vehicle as described above, if the engine has stopped due to some cause while the vehicle is traveling at high speed, the engine cannot in some cases be restarted immediately. This is because when the engine is started using a motor generator while the vehicle is traveling, the motor generator may in some cases generate power. Since power generation is restricted if charging is not permitted due to the state of charge of a power storage device being high, for example, the engine cannot sometimes be restarted immediately.

With the engine start control system disclosed in the above-described publication, such a problem is not considered at all, and thus cannot be solved.

An object of the present invention is to provide a vehicle and a control method for a vehicle wherein an engine is controlled to be in a restartable state upon reception of a stop command for the engine during traveling at high speed.

Solution to Problem

A vehicle according to one aspect of the present invention includes: a drive shaft for causing a drive wheel to rotate; an internal combustion engine; a first rotating electric machine; a power storage device for supplying and receiving power to and from the first rotating electric machine; a power transmission device mechanically coupling three elements, which are the drive shaft, an output shaft of the internal combustion engine, and a rotation shaft of the first rotating electric machine, the power transmission device utilizing any one of the three elements as a reaction force element, thereby allowing for transmission of motive power between the other two elements; an input unit for receiving a stop command for a system of a vehicle from a driver; and a control unit for controlling the first rotating electric machine such that torque of the first rotating electric machine is transmitted to the output shaft of the internal combustion engine, when the stop command has been received at the input unit while the vehicle is traveling, and when a predetermined condition in which input power is restricted in the power storage device is satisfied.

Preferably, the first rotating electric machine generates power when the internal combustion engine in a stopped state is started while the vehicle is traveling.

More preferably, the control unit controls the internal combustion engine to stop fuel injection to the internal combustion engine when the stop command has been received at the input unit while the vehicle is traveling.

Still more preferably, the control unit controls the first rotating electric machine such that power consumed in the first rotating electric machine increases as a degree of restriction of the input power increases, when the stop command has been received at the input unit while the vehicle is traveling, and when the predetermined condition is satisfied.

Even more preferably, the predetermined condition includes a condition that a state of charge of the power storage device is higher than a threshold value.

Still more preferably, the predetermined condition includes a condition that a temperature of the power storage device is lower than a threshold value.

Even more preferably, the predetermined condition includes a condition that a charge duration time of the power storage device exceeds a prescribed time.

Still more preferably, the vehicle further includes a second rotating electric machine of which rotation shaft is coupled to the drive shaft. The control unit controls the second rotating electric machine such that reaction force against the torque of the first rotating electric machine is generated, when the stop command has been received at the input unit while the vehicle is traveling, and when the predetermined condition is satisfied.

Even more preferably, the power transmission device is a planetary gear mechanism having a sun gear, a pinion gear, a carrier, and a ring gear. The sun gear is coupled to the rotation shaft of the first rotating electric machine. The carrier is coupled to the output shaft of the internal combustion engine. The ring gear is coupled to the drive shaft.

A control method for a vehicle according to another aspect of the present invention is a control method for a vehicle used in a vehicle including a drive shaft for causing a drive wheel to rotate, an internal combustion engine, a rotating electric machine, a power storage device for supplying and receiving power to and from the rotating electric machine, and a power transmission device mechanically coupling three elements, which are the drive shaft, an output shaft of the internal combustion engine, and a rotation shaft of the rotating electric machine, the power transmission device utilizing any one of the three elements as a reaction force element, thereby allowing for transmission of motive power between the other two elements. The control method for a vehicle includes the steps of: determining whether a stop command for a system of the vehicle has been received from a driver or not; and controlling the vehicle such that torque of the rotating electric machine is transmitted to the output shaft of the internal combustion engine, when the stop command has been received while the vehicle is traveling, and when a predetermined condition in which input power is restricted in the power storage device is satisfied.

Advantageous Effects of Invention

According to the present invention, the power can be consumed in the first rotating electric machine, by controlling the vehicle such that the torque of the first rotating electric machine is transmitted to the internal combustion engine when the predetermined condition in which the input power is restricted in the power storage device is satisfied. The state of charge of the power storage device can be reduced by causing the power to be consumed in the first rotating electric machine. As a result, when the input power is restricted due to the state of charge being high, the degree of restriction can be alleviated. Therefore, the power generated through power generation by the first rotating electric machine can be absorbed into the power storage device. Furthermore, when reduction in the rotational speed of the internal combustion engine is suppressed, even if the IG ON operation is subsequently performed by the driver to cause the internal combustion engine to be started using the first rotating electric machine, the internal combustion engine can be started without generating power in the first rotating electric machine. In this way, the internal combustion engine can be started immediately in response to the driver's request. Thus, there can be provided a vehicle and a control method for a vehicle wherein an engine is controlled to be in a restartable state when a stop command for the engine has been received during high-speed traveling.

DESCRIPTION OF EMBODIMENTS

Embodiments of the present invention will be described hereinafter, with reference to the drawings. In the following description, the same components are denoted by the same symbols. The names and functions thereof are also the same. Accordingly, detailed description thereof will not be repeated.

Figure 1:
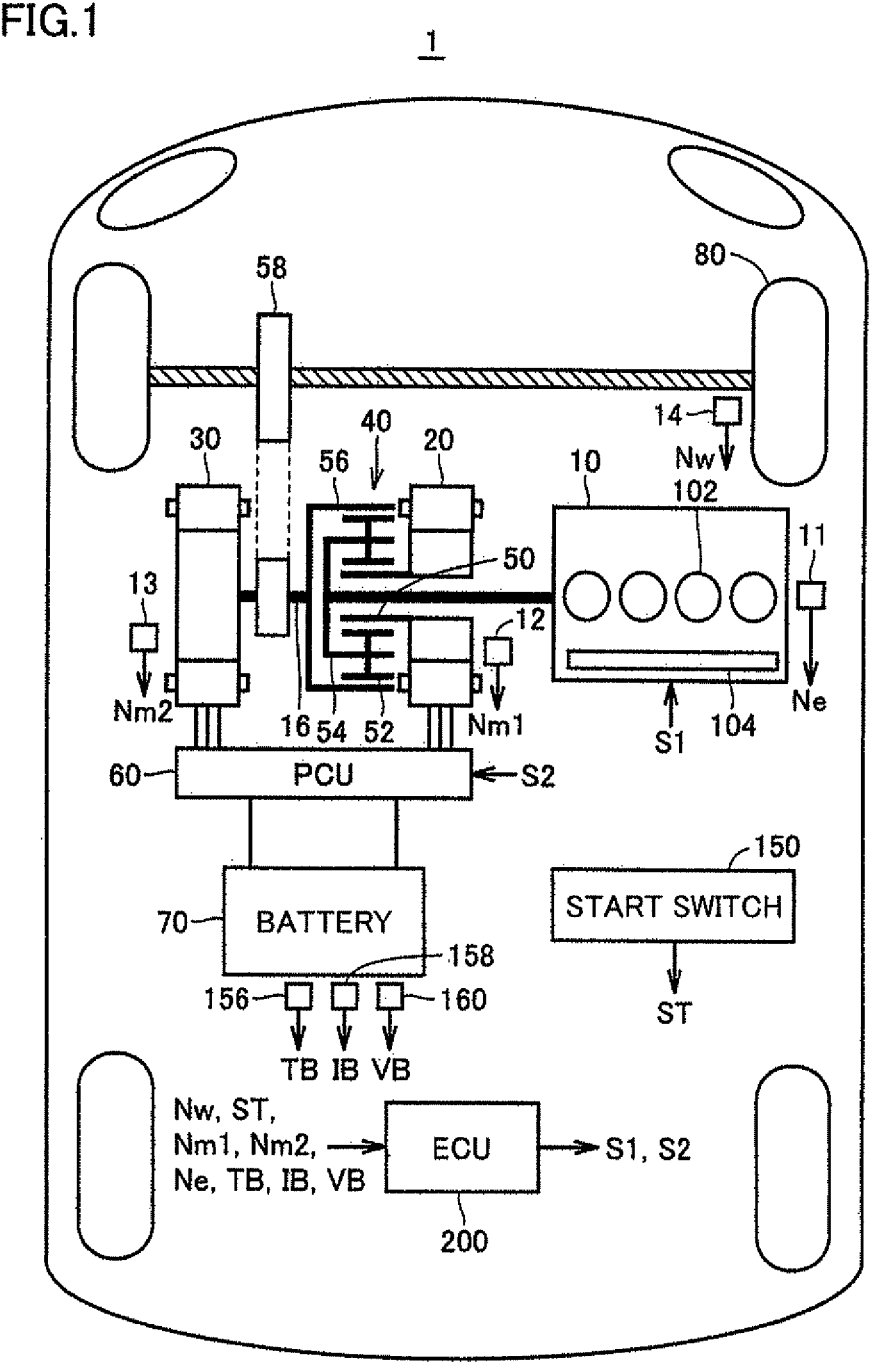
FIG. 1 is an overall block diagram of a vehicle according to the present embodiment.

Referring to FIG. 1, an overall block diagram of a vehicle 1 according to the present embodiment will be described. Vehicle 1 includes an engine 10, a drive shaft 16, a first motor generator (hereinafter referred to as first MG) 20, a second motor generator (hereinafter referred to as second MG) 30, a power split device 40, a speed reducer 58, a PCU (Power Control Unit) 60, a battery 70, drive wheels 80, a start switch 150, and an ECU (Electronic Control Unit) 200.

Vehicle 1 travels with driving force output from at least one of engine 10 and second MG 30. Motive power generated by engine 10 is split for two paths by power split device 40. Of the two paths, one is a path for transmission via speed reducer 58 to drive wheels 80, and the other is a path for transmission to first MG 20.

First MG 20 and second MG 30 are, for example, three-phase AC rotating electric machines. First MG 20 and second MG 30 are driven by PCU 60.

First MG 20 has a function as a generator which generates power using motive power of engine 10 split by power split device 40, to charge battery 70 via PCU 60. In addition, receiving power from battery 70, first MG 20 rotates a crankshaft of engine 10 which serves as an output shaft. First MG 20 thereby has a function as a starter which starts engine 10.

Second MG 30 has a function as a drive motor which provides driving force for drive wheels 80 using at least any one of power stored in battery 70 and power generated by first MG 20. In addition, second MG 30 has a function as a generator for charging battery 70 via PCU 60 with the use of power generated through regenerative braking.

Engine 10 is, for example, an internal combustion engine such as a gasoline engine and a diesel engine. Engine 10 includes a plurality of cylinders 102 and a fuel injection device 104 which supplies fuel to each of the plurality of cylinders 102. Based on a control signal S1 from ECU 200, fuel injection device 104 injects an appropriate amount of fuel for each cylinder with appropriate timing and stops injecting fuel for each cylinder.

For the detection of the rotational speed of the crankshaft of engine 10 (hereinafter referred to as engine rotational speed) Ne, engine 10 is further provided with an engine rotational speed sensor 11. Engine rotational speed sensor 11 transmits a signal indicating detected engine rotational speed Ne to ECU 200.

Power split device 40 mechanically couples together three elements for rotating drive wheels 80: drive shaft 16, the output shaft of engine 10, and a rotation shaft of first MG 20. Power split device 40 utilizes any one of the above-indicated three elements as a reaction force element, thereby allowing for the transfer of motive power between the other two elements. A rotation shaft of second MG 30 is coupled to drive shaft 16.

Power split device 40 is a planetary gear mechanism including a sun gear 50, pinion gears 52, a carrier 54, and a ring gear 56. Pinion gear 52 engages with each of sun gear 50 and ring gear 56. Carrier 54 supports pinion gears 52 in a manner to allow them to rotate, and is coupled to a crankshaft of engine 10. Sun gear 50 is coupled to the rotation shaft of first MG 20. Ring gear 56 is coupled via drive shaft 16 to the rotation shaft of second MG 30 and speed reducer 58.

Speed reducer 58 transfers motive power from power split device 40 and second MG 30 to drive wheels 80. In addition, speed reducer 58 transfers reaction force received by drive wheels 80 from a road surface, to power split device 40 and second MG 30.

PCU 60 converts DC power stored in battery 70 into AC power for driving first MG 20 and second MG 30. PCU 60 includes a converter and an inverter (both not shown) which are controlled based on a control signal S2 from ECU 200. The converter boosts a voltage of DC power received from battery 70 and outputs the boosted power to the inverter. The inverter converts the DC power output from the converter into AC power for output to first MG 20 and/or second MG 30. First MG 20 and/or second MG 30 are thus driven by using the power stored in battery 70. In addition, the inverter converts AC power generated by first MG 20 and/or second MG 30 into DC power and outputs it to the converter. The converter steps down a voltage of the DC power output by the inverter and outputs the stepped down power to battery 70. Battery 70 is thereby charged with the use of the power generated by first MG 20 and/or second MG 30. It is noted that the converter may be omitted.

Battery 70 is a power storage device and a rechargeable DC power supply. As battery 70, for example, a secondary battery such as a nickel-metal hydride secondary battery and a lithium ion secondary battery is used. Battery 70 has a voltage of the order of 200 V, for example. Battery 70 may be charged, other than with the use of the power generated by first MG 20 and/or second MG 30 as described above, with the use of power supplied from an external power supply (not shown). It is noted that battery 70 is not limited to a secondary battery, and may be anything that can generate a DC voltage, such as a capacitor, a solar cell, and a fuel cell, for example.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push switch. Start switch 150 may be one that allows a key to be inserted into a key cylinder and rotated to a prescribed position. Start switch 150 is connected to ECU 200. In response to an operation of start switch 150 by a driver, start switch 150 transmits a signal ST to ECU 200.

ECU 200 determines that a start command has been received when, for example, signal ST has been received while the system of vehicle 1 is in a stop state, and then ECU 200 shifts the system of vehicle 1 from the stop state to a startup state. In addition, ECU 200 determines that a stop command has been received when signal ST has been received while the system of vehicle 1 is in the startup state, and then ECU 200 shifts the system of vehicle 1 from the startup state to the stop state. In the following descriptions, operation of start switch 150 by the driver when the system of vehicle 1 is in the startup state will be referred to as an IG OFF operation, and operation of start switch 150 by the driver when the system of vehicle 1 is in the stop state will be referred to as an IG ON operation. Once the system of vehicle 1 shifts to the startup state, for example, a plurality of pieces of equipment necessary for vehicle 1 to travel are supplied with power, and then enter an operable state. In contrast, once the system of vehicle 1 shifts to the stop state, for example, part of the plurality of pieces of equipment necessary for vehicle 1 to travel are no longer supplied with power, and then enter an operation stop state.

A first resolver 12 detects rotational speed Nm1 of first MG 20. First resolver 12 transmits a signal indicating detected rotational speed Nm1 to ECU 200. A second resolver 13 detects rotational speed Nm2 of second MG 30. Second resolver 13 transmits a signal indicating detected rotational speed Nm2 to ECU 200.

A wheel speed sensor 14 detects rotational speed Nw of drive wheels 80. Wheel speed sensor 14 transmits a signal indicating detected rotational speed Nw to ECU 200. ECU 200 calculates vehicle speed V based on rotational speed Nw received. It is noted that ECU 200 may calculate vehicle speed V based on rotational speed Nm2 of second MG 30 instead of rotational speed Nw.

ECU 200 generates control signal S1 for controlling engine 10 and outputs generated control signal S1 to engine 10. Further, ECU 200 generates control signal S2 for controlling PCU 60 and outputs generated control signal S2 to PCU 60.

By controlling engine 10, PCU 60, and the like, ECU 200 controls the entire hybrid system, that is, a state of charging/discharging of battery 70 and states of operation of engine 10, first MG 20 and second MG 30 such that vehicle 1 can travel most efficiently.

ECU 200 calculates requested driving force which corresponds to an amount of depression of an accelerator pedal (not shown) provided at a driver's seat. ECU 200 controls torque of first MG 20 and second MG 30, and an output of engine 10, in accordance with the calculated requested driving force.

Vehicle 1 having a configuration as described above travels solely on second MG 30 when engine 10 is inefficient at the start of traveling or during low-speed traveling. In addition, during normal traveling, for example, power split device 40 divides motive power of engine 10 into two paths of motive power. Motive power in one path directly drives drive wheels 80. Motive power in the other path drives first MG 20 to generate power. At this time, ECU 200 uses generated power to drive second MG 30. In this way, by driving second MG 30, assistance in driving drive wheels 80 is provided.

When vehicle 1 reduces its speed, regenerative braking is performed with second MG 30, which follows the rotation of drive wheels 80, functioning as a generator. The power recovered through regenerative braking is stored in battery 70. It is noted that when remaining capacitance (hereinafter referred to as SOC (State of Charge)) of the power storage device has lowered and is particularly in need of charging, ECU 200 increases an output of engine 10 to increase an amount of power generated by first MG 20. The SOC of battery 70 is thereby increased. In addition, even during low-speed traveling, ECU 200 may exert control for increasing driving force from engine 10 as necessary, for example, such as when battery 70 is in need of charging as described above, when auxiliary machinery such as an air conditioner is to be driven, and when the temperature of cooling water for engine 10 is to be raised to a prescribed temperature.

In controlling amounts of charging and discharging of battery 70, ECU 200 sets, based on battery temperature TB and the current SOC, allowable input power in charging battery 70 (hereinafter referred to as "charge power upper limit value Win") and allowable output power in discharging battery 70 (hereinafter referred to as "discharge power upper limit value Wout"). For instance, as the current SOC gets lower, discharge power upper limit value Wout is gradually set lower. In contrast, as the current SOC gets higher, charge power upper limit value Win is gradually set lower.

In addition, the secondary battery used as battery 70 has temperature dependence that causes an increase in internal resistance at low temperatures. In addition, at high temperatures, it is necessary to prevent an overincrease in temperature caused by further heat generation. It is therefore preferable to lower each of discharge power upper limit value Wout and charge power upper limit value Win when battery temperature TB is low and when battery temperature TB is high. ECU 200 sets charge power upper limit value Win and discharge power upper limit value Wout in accordance with battery temperature TB and the current SOC, for example, through the use of a map or the like.

In vehicle 1 having the configuration described above, if engine 10 has stopped due to some cause during high-speed traveling, the engine cannot in some cases be restarted immediately. It is assumed that vehicle 1 is traveling at high speed, as indicated by the solid line shown in the nomographic chart of FIG. 2, for example.

Figure 2:
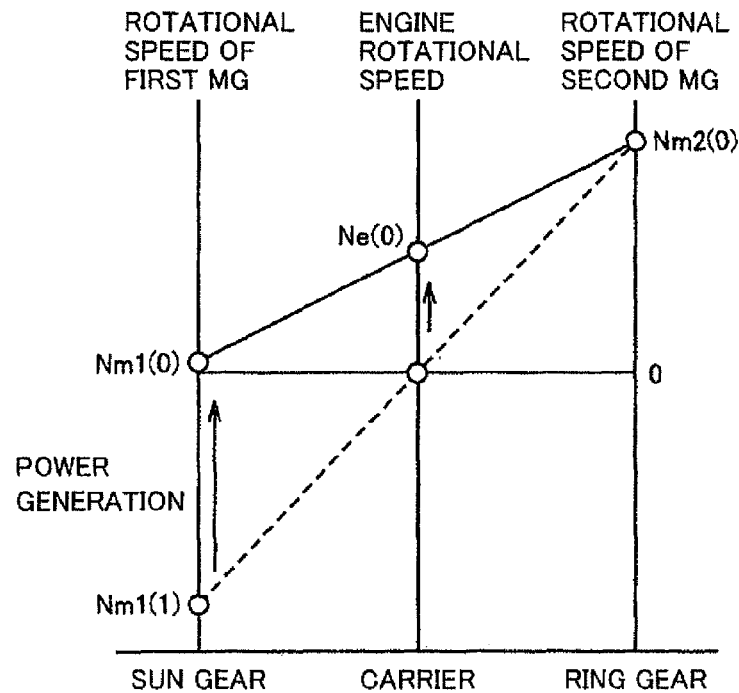
FIG. 2 is a (first) nomographic chart for illustrating operation of the vehicle in the present embodiment.

Of the three vertical axes of the nomographic chart shown in FIG. 2, the left vertical axis indicates the rotational speed of sun gear 50, that is, rotational speed Nm1 of first MG 20. The center vertical axis of the nomographic chart shown in FIG. 2 indicates the rotational speed of carrier 54, that is, engine rotational speed Ne. The right vertical axis of the nomographic chart shown in FIG. 2 indicates the rotational speed of ring gear 56, that is, rotational speed Nm2 of second MG 30. It is noted that the direction of an arrow formed by each vertical axis of the nomographic chart of FIG. 2 indicates a positive rotational direction, and a direction opposite to the direction of the arrow indicates a negative rotational direction.

While vehicle 1 is traveling, rotational speed Nm1 of first MG 20, engine rotational speed Ne, and rotational speed Nm2 of second MG 30 vary in such a manner that rotational speeds Nm1, Ne and Nm2 of these elements maintain such a relation that they are connected by a straight line in the nomographic chart of FIG. 2.

As indicated by the solid line in FIG. 2, it is assumed that rotational speed Nm1 of first MG 20 is Nm1(0), engine rotational speed Ne is Ne(0), and rotational speed Nm2 of second MG 30 is Nm2(0).

If rotation of engine 10 has stopped when the IG OFF operation is performed while vehicle 1 is traveling at high speed, vehicle 1 enters a state indicated by the broken line in FIG. 2. It is now assumed that engine 10 is started using first MG 20. In this case, it is necessary to increase engine rotational speed Ne to be higher than a lowest engine rotational speed at which first explosion can occur, by elevating rotational speed Nm1 of first MG 20 from Nm1(1) to Nm1(0).

It is thus necessary to generate torque in the positive rotational direction opposite to a rotational direction of first MG 20 (negative rotational direction). First MG 20, however, generates power in the process of elevating the rotational speed of first MG 20 from Nm1(1) to Nm1(0). Thus, if charging is restricted due to the SOC of battery 70 being higher than a normal SOC range, that is, if charge power upper limit value Win is lower than a case where the SOC is within the normal SOC range, first MG 20 may not be able to generate power. Therefore, the engine cannot in some cases be restarted immediately.

Accordingly, the present embodiment has a feature in that first MG 20 is controlled to transmit torque of first MG 20 to the output shaft of engine 10 when ECU 200 has received the stop command at start switch 150 while vehicle 1 is traveling, and when a predetermined condition in which the input power is restricted in battery 70 is satisfied.

Figure 3:
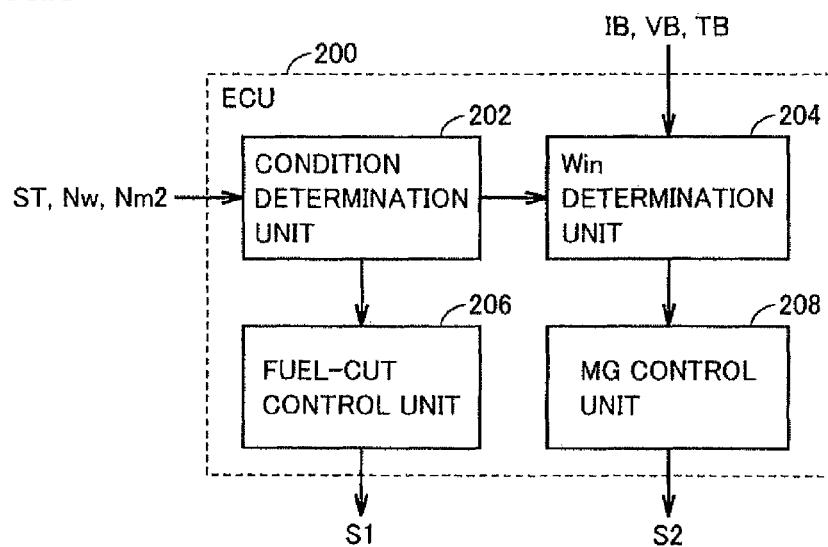
FIG. 3 is a functional block diagram of an ECU mounted on the vehicle according to the present embodiment.

FIG. 3 shows a functional block diagram of ECU 200 mounted on vehicle 1 according to the present embodiment. ECU 200 includes a determination unit 202, a Win determination unit 204, a fuel-cut control unit 206, and an MG control unit 208.

Determination unit 202 determines whether the IG OFF operation has been performed or not. Determination unit 202 determines that the IG OFF operation has been performed (the stop command has been received) when signal ST has been received from start switch 150 while the system of vehicle 1 is in the start state. It is noted that determination unit 202 may, for example, turn an IG OFF determination flag on when the IG OFF operation has been performed.

Further, determination unit 202 determines whether vehicle 1 is traveling or not. Determination unit 202 determines that vehicle 1 is traveling when vehicle speed V is higher than a prescribed vehicle speed V(0). It is noted that determination unit 202 may turn a travel determination flag on when it is determined that vehicle 1 is traveling.

When determination unit 202 has determined that the IG OFF operation has been performed and vehicle 1 is traveling, Win determination unit 204 determines whether the predetermined condition in which the input power is restricted in battery 70 is satisfied or not. The predetermined condition is that charge power upper limit value Win is lower than a threshold value Win(0). The predetermined condition includes, for example, at least any one of the following conditions: a condition that the SOC of battery 70 is higher than a threshold value SOC(0); a condition that battery temperature TB of battery 70 is lower than a threshold value TB(0); and a condition that a charge duration time Tc of battery 70 immediately before is longer than a prescribed time Tc(0).

Win determination unit 204 estimates the SOC based on battery temperature TB, current IB and voltage VB. For example, Win determination unit 204 estimates an internal resistance having a characteristic dependent on battery temperature TB, based on battery temperature TB. Win determination unit 204 estimates an open circuit voltage (OCV) from the estimated internal resistance, current IB and voltage VB. Win determination unit 204 estimates the SOC based on the estimated open circuit voltage. It is noted that the above-described method of estimating the SOC is merely by way of example, and any other known technique may be used to estimate the SOC of battery 70.

It is noted that Win determination unit 204 may determine whether the predetermined condition is satisfied or not when, for example, both the IG OFF determination flag and the travel determination flag are in the ON state. Win determination unit 204 may also turn the Win determination flag on when the predetermined condition is satisfied.

When determination unit 202 has determined that the IG OFF operation has been performed, and has also determined that vehicle 1 is traveling, fuel-cut control unit 206 executes fuel-cut control to stop fuel injection to cylinders 102. Fuel-cut control unit 206 generates control signal S1 indicating the execution of the fuel-cut control, and transmits generated control signal S1 to engine 10. It is noted that fuel-cut control unit 206 may execute the fuel-cut control when, for example, both the IG OFF determination flag and the travel determination flag are in the ON state. Fuel-cut control unit 206 may also stop the fuel injection to cylinders 102 by not transmitting control signal S1 to engine 10.

MG control unit 208 controls first MG 20 and second MG 30 to transmit torque of first MG 20 to the output shaft of engine 10 when Win determination unit 204 has determined that the predetermined condition has been satisfied.

When it has been determined that the predetermined condition has been satisfied, MG control unit 208 controls first MG 20 and second MG 30 such that first MG 20 generates positive torque in the positive rotational direction, in order to consume power in first MG 20.

In the present embodiment, MG control unit 208 controls first MG 20 such that the power consumed in first MG 20 increases as the degree of restriction of the input power in battery 70 increases.

When the predetermined condition is satisfied, MG control unit 208 controls first MG 20 such that the power consumed in first MG 20 increases as a difference between the SOC and threshold value SOC(0) increases.

Moreover, when the predetermined condition is satisfied, MG control unit 208 controls first MG 20 such that the power consumed in first MG 20 increases as a difference between battery temperature TB and threshold value TB(0) increases.

Furthermore, when the predetermined condition is satisfied, MG control unit 208 controls first MG 20 such that the power consumed in first MG 20 increases as a difference between charge duration time Tc and prescribed time Tc(0) increases.

MG control unit 208 increases the power consumption by increasing the torque generated in first MG 20. That is, MG control unit 208 determines a torque command value Treq1 of first MG 20 in accordance with charge power upper limit value Win. For example, when charge power upper limit value Win is lower than threshold value Win(0), MG control unit 208 determines torque command value Treq1 of first MG 20 such that the torque generated in first MG 20 increases as charge power upper limit value Win decreases.

Moreover, MG control unit 208 controls second MG 30 to generate reaction force torque against the torque of first MG 20. This is because when the torque in the positive rotational direction is generated in first MG 20, the torque generated in first MG 20 causes torque in the negative rotational direction to be generated in second MG 30, which causes vehicle 1 to be rapidly decelerated. The reaction force torque can be reduced by MG control unit 208 causing second MG 30 to generate the torque in the positive rotational direction. It is noted that MG control unit 208 may determine a torque command value Treq2 of second MG 30 such that torque corresponding to the reaction force torque is generated in second MG 30. Alternatively, MG control unit 208 may determine torque command value Treq2 of second MG 30 such that torque less than the torque corresponding to the reaction force torque is generated in second MG 30. MG control unit 208 may determine torque command value Treq2 such that deceleration of vehicle 1 becomes lower than a threshold value, for example. The threshold value of deceleration is for determining whether a shock perceptible by the driver occurs in vehicle 1 due to large deceleration or not.

Furthermore, MG control unit 208, for example, may continue controlling first MG 20 and second MG 30 until vehicle 1 stops or may continue controlling first MG 20 and second MG 30 until the IG ON operation is performed by the driver.

It is noted that when the Win determination flag is in the ON state, MG control unit 208 may control first MG 20 and second MG 30 to transmit the torque of first MG 20 to the output shaft of engine 10.

Although determination unit 202, Win determination unit 204, fuel-cut control unit 206, and MG control unit 208 are described in the present embodiment as realized through execution of a program stored in a memory by a CPU of ECU 200 and as functioning as software, they may be realized by hardware. It is noted that such a program is recorded in a storage medium for installation in the vehicle.

Figure 4:
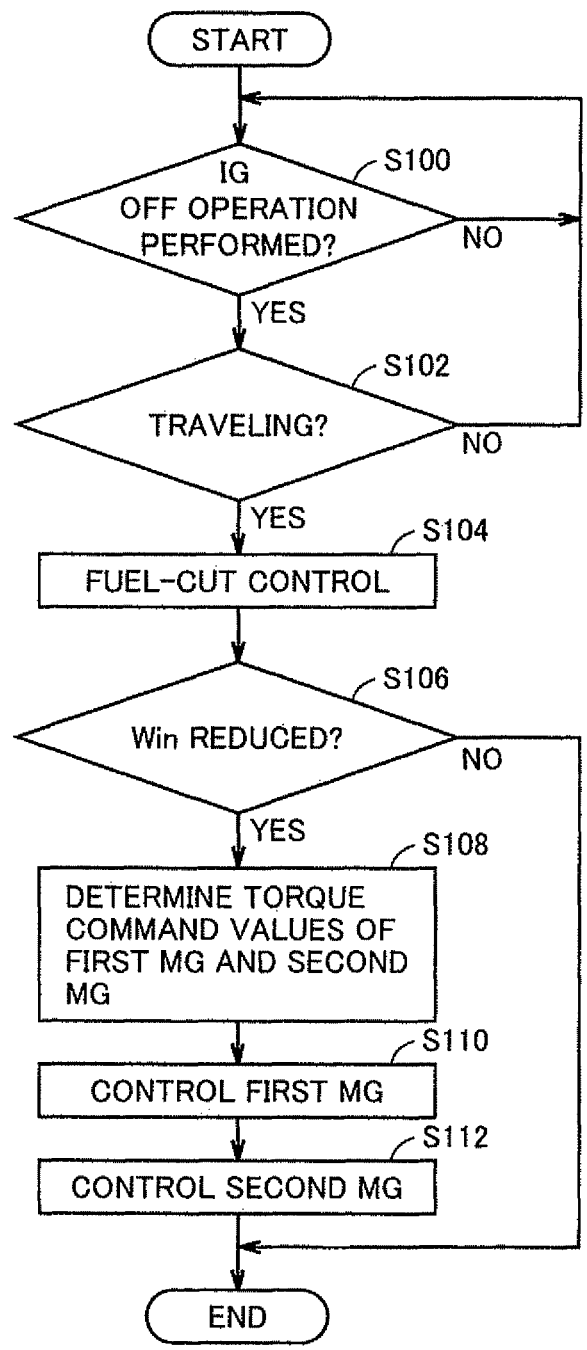
FIG. 4 is a flowchart of a program executed by the ECU mounted on the vehicle according to the present embodiment.

Referring to FIG. 4, a control structure of a program executed by ECU 200 mounted on vehicle 1 according to the present embodiment will be described.

In step ("step" will hereinafter be denoted as "S") 100, ECU 200 determines whether the IG OFF operation has been performed or not. If the IG OFF operation has been performed (YES in S100), the process is transferred to S102. If not (NO in S100), the process is returned to S100.

In S102, ECU 200 determines whether vehicle 1 is traveling or not. ECU 200 determines that vehicle 1 is traveling when vehicle speed V of vehicle 1 is equal to or higher than prescribed vehicle speed V(0). If vehicle 1 is traveling (YES in S102), the process is transferred to S104. If not (NO in S102), the process is returned to S100.

In S104, ECU 200 executes the fuel-cut control. In S106, ECU 200 determines whether Win is reduced or not. That is, when the predetermined condition is satisfied, ECU 200 determines that Win is reduced. If charge power upper limit value Win is reduced (YES in S106), the process is transferred to S108. If not (NO in S106), the process ends.

In S108, ECU 200 determines torque command value Treq1 of first MG 20 in accordance with charge power upper limit value Win, and determines torque command value Treq2 of second MG 30 based on determined torque command value Treq1 of first MG 20. Since the method of determining torque command values Treq1 and Treq2 is as described above, detailed description thereof will not be repeated.

In S110, first MG 20 is controlled to generate torque in accordance with determined torque command value Treq1. In S112, second MG 30 is controlled to generate torque in accordance with determined torque command value Treq2.

Operation of ECU 200 mounted on vehicle 1 according to the present embodiment based on the foregoing structure and flowchart will now be described with reference to the nomographic chart of FIG. 5. Since the element denoted by each axis in the nomographic chart is the same as that in the nomographic chart of FIG. 2, detailed description thereof will not be repeated.

Figure 5:
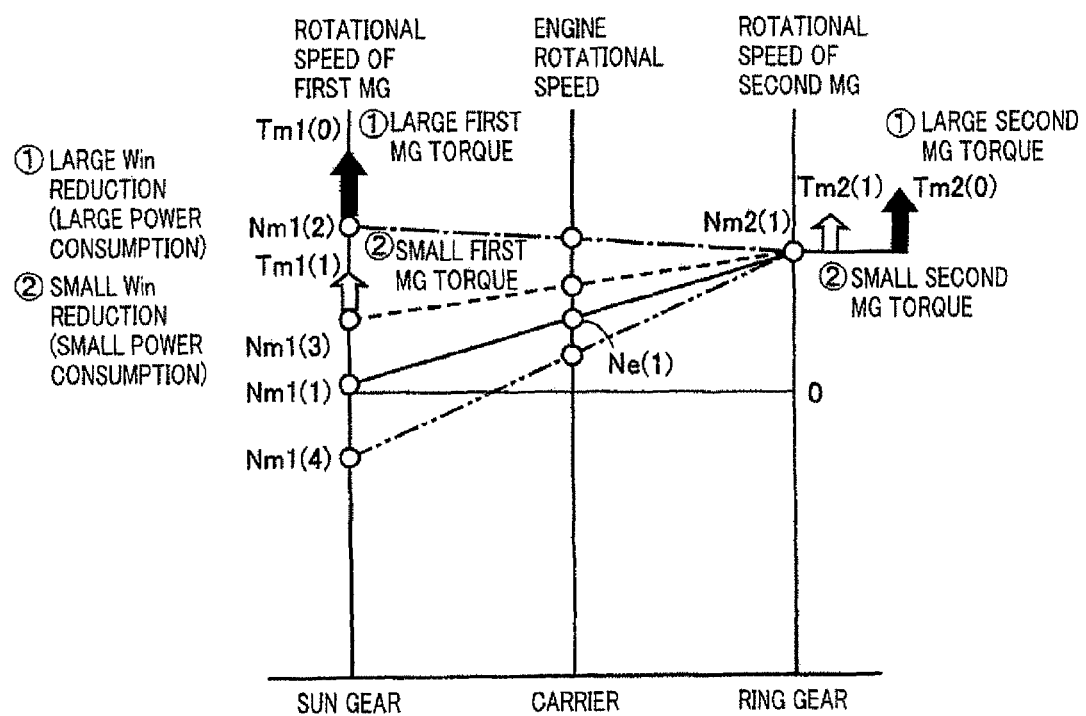
FIG. 5 is a (second) nomographic chart for illustrating operation of the vehicle in the present embodiment.

As indicated by the solid line in FIG. 5, it is assumed that rotational speed Nm1 of first MG 20 is Nm1(1) (positive rotational direction), engine rotational speed Ne is Ne(1), and rotational speed Nm2 of second MG 30 is Nm2(1).

If the IG OFF operation is performed while vehicle 1 is traveling at high speed (YES in S100 and YES in S102), the fuel-cut control is executed (S104). If charge power upper limit value Win is reduced in battery 70 (YES in S106), torque command value Treq1 of first MG 20 corresponding to charge power upper limit value Win is determined, and torque command value Treq2 of second MG 30 is determined based on determined torque command value Treq1 of first MG 20 (S108). First MG 20 and second MG 30 are then controlled based on determined torque command values Treq1 and Treq2 (S110, S112).

Torque Tm1(0) (the (black) arrows in FIG. 5) generated in first MG 20 when the predetermined condition is satisfied and when an amount of reduction in charge power upper limit value Win is large (hereinafter simply described as "in the case of a large reduction") is greater than torque Tm1(1) generated in first MG 20 when the amount of reduction in charge power upper limit value Win is small (hereinafter simply described as "in the case of a small reduction").

Here, rotational speed Nm1(2) of first MG 20 in the case of a large reduction is higher than rotational speed Nm1(3) of first MG 20 in the case of a small reduction. Therefore, power consumption (rotational speed×torque) in first MG 20 in the case of a large reduction is greater than power consumption in first MG 20 in the case of a small reduction.

Torque Tm2(0) (the (black) arrows in FIG. 5) generated in second MG 30 in the case of a large reduction is greater than torque Tm2(1) generated in second MG 30 in the case of a small reduction. Since the torque generated in second MG 30 is thus determined in accordance with the torque generated in first MG 20, rapid deceleration of vehicle 1 is suppressed.

Moreover, the SOC of battery 70 is lowered by power consumption in first MG 20. Furthermore, since stopping of rotation of the output shaft of engine 10 is suppressed by driving first MG 20, engine 10 can be started immediately in response to a request for restarting the engine, such as the IG ON operation performed by the driver. In this case, engine 10 is started without generating power because first MG 20 is rotating in the positive rotational direction.

As described above, with the vehicle according to the present embodiment, the SOC of battery 70 can be lowered by consuming power in first MG 20 when the IG OFF operation is performed during traveling and when the predetermined condition in which the input power is restricted in battery 70 is satisfied. Thus, the degree of restriction when charge power upper limit value Win is restricted due to the SOC being high can be alleviated. Furthermore, since a state where first MG 20 is rotating in the positive rotational direction is maintained, the engine can be started without generating power in first MG 20 when engine 10 is started by the IG ON operation performed by the driver. Furthermore, even if power generation occurs in first MG 20 at the time of start, the power generated at the time of start can be absorbed into battery 70 by consuming the power in power storage device 70 in advance. Therefore, engine 10 can be started immediately in response to the driver's request. Thus, there can be provided a vehicle and a control method for a vehicle wherein an engine is controlled to be in a restartable state when a stop command for the engine has been received during high-speed traveling. Furthermore, charging of battery 70 over charge power upper limit value Win when engine 10 is started can be avoided. Thus, deterioration of battery 70 can be prevented.

It is noted that if vehicle 1 is in a state indicated by the two-dot chain line in FIG. 5 when the IG OFF operation is performed by the driver during traveling, first MG 20 is rotating in the negative rotational direction, which may cause first MG 20 to generate power by generating torque in the positive rotational direction. In this case, for example, ECU 200 may control first MG 20 such that prior to executing the fuel-cut control of engine 10, for example, vehicle 1 is decelerated with a braking device or the like, and the torque of first MG 20 is transmitted to engine 10 at the time point when first MG 20 has started rotating in the positive rotational direction.

Alternatively, ECU 200 may cause the rotational speed of first MG 20 to move in the positive rotational direction while maintaining a balance of power of first MG 20 and second MG 30 at zero. ECU 200 controls, for example, first MG 20 and second MG 30 such that the generated power is consumed in second MG 30 during a time period until rotational speed Nm1 of first MG 20 becomes zero. In this way, first MG 20 rotating in the negative rotational direction can be rotated in the positive rotational direction without burdening battery 70. ECU 200 may control first MG 20 such that the fuel-cut control of engine 10 is executed and the torque of first MG 20 is transmitted to engine 10 at the time point when first MG 20 has started rotating in the positive rotational direction.

Preferably, it is desirable that ECU 200 control first MG 20 such that, when the torque of first MG 20 is transmitted to engine 10, engine rotational speed Ne reaches a target value. For example, by setting, as the target value, a rotational speed that is equal to or higher than the rotational speed at which first explosion can occur, engine 10 can be started immediately when the IG ON operation is performed by the driver.

Furthermore, in the present embodiment, control of the first MG is not executed when Win is not reduced. In this way, an increase in the amount of power consumption can be suppressed and deterioration of fuel efficiency can be suppressed.

Moreover, ECU 200 may determine that the predetermined condition in which the input power is restricted in battery 70 is satisfied when charge power upper limit value Win is lower than threshold value Win(0). Furthermore, ECU 200 may control first MG 20 such that, when charge power upper limit value Win is lower than threshold value Win(0), for example, the power consumed in first MG 20 increases as a difference between charge power upper limit value Win and threshold value Win(0) increases. MG control unit 208 may control first MG 20 such that, when charge power upper limit value Win is lower than threshold value Win(0), the power consumed where charge power upper limit value Win is a first value becomes greater than the power consumed where charge power upper limit value Win is a second value higher than the first value.

Moreover, ECU 200 may control first MG 20 such that, when the predetermined condition is satisfied, the power consumed where the SOC has a first value becomes greater than the power consumed where the SOC has a second value (>SOC(0)) lower than the first value.

Moreover, ECU 200 may control first MG 20 such that, when the predetermined condition is satisfied, the power consumed where battery temperature TB has a first value becomes greater than the power consumed where the battery temperature has a second value (<TB(0)) higher than the first value.

Furthermore, ECU 200 may control first MG 20 such that, when the predetermined condition is satisfied, the power consumed where charge duration time Tc lasts for a first period becomes greater than the power consumed where charge duration time Tc lasts for a second period (>Tc(0)) shorter than the first period.

It is noted that when each of various parameters (Win, SOC, battery temperature TB, and charge duration time Tc) exceeds a threshold value, ECU 200 may cause the power consumption to change in proportion to a difference between an actual value and the threshold value, or may cause the power consumption to change gradually in accordance with a difference between the actual value and the threshold value.

While FIG. 1 shows vehicle 1 having drive wheels 80 as front wheels by way of example, the present invention is not particularly limited to such a drive system. For example, vehicle 1 may have the drive wheels as rear wheels. Alternatively, vehicle 1 may be a vehicle in which second MG 30 in FIG. 1 is omitted. Still alternatively, vehicle 1 may be a vehicle in which second MG 30 in FIG. 1 is coupled to a drive shaft for driving the rear wheels, instead of being coupled to drive shaft 16 of the front wheels. Moreover, a speed change mechanism may be provided between drive shaft 16 and speed reducer 58 or between drive shaft 16 and second MG 30.

Furthermore, while ECU 200 has been described as being a single ECU in FIG. 1, two or more ECUs may be used. For example, the operation of ECU 200 in FIG. 1 may be shared by an engine ECU for controlling engine 10 and a hybrid ECU for controlling PCU 60.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10 engine; 11 engine rotational speed sensor; 12 first resolver; 13 second resolver; 14 wheel speed sensor; 16 drive shaft; 40 power split device; 50 sun gear; 52 pinion gear; 54 carrier; 56 ring gear; 58 speed reducer; 70 battery; 80 drive wheel; 102 cylinder; 104 fuel injection device; 150 start switch; 156 battery temperature sensor; 158 current sensor; 160 voltage sensor; 200 ECU; 202 determination unit; 204 Win determination unit; 206 fuel-cut control unit; 208 MG control unit.

The invention claimed is:
1. A vehicle comprising:
a drive shaft for causing a drive wheel to rotate;
an internal combustion engine;
a first rotating electric machine;
a power storage device for supplying and receiving power to and from said first rotating electric machine;
a power transmission device mechanically coupling three elements, which are said drive shaft, an output shaft of said internal combustion engine, and a rotation shaft of said first rotating electric machine, said power transmission device utilizing any one of said three elements as a reaction force element, thereby allowing for transmission of motive power between the other two elements;
an input unit for receiving a stop command for a system of a vehicle from a driver; and a control unit for controlling said first rotating electric machine such that torque of said first rotating electric machine is transmitted to said output shaft of said internal combustion engine, by supplying electric power from said power storage device to said first rotating electric machine, when said stop command has been received at said input unit while said vehicle is traveling, and when a predetermined condition in which input power is restricted in said power storage device is satisfied.

2. The vehicle according to claim 1, wherein
said first rotating electric machine generates power when said internal combustion engine in a stopped state is started while said vehicle is traveling.

3. The vehicle according to claim 1, wherein
said control unit controls said internal combustion engine to stop fuel injection to said internal combustion engine when said stop command has been received at said input unit while said vehicle is traveling.

4. The vehicle according to claim 1, wherein
said control unit controls said first rotating electric machine such that power consumed in said first rotating electric machine increases as a degree of restriction of said input power increases, when said stop command has been received at said input unit while said vehicle is traveling, and when said predetermined condition is satisfied.

5. The vehicle according to claim 1, wherein
said predetermined condition includes a condition that a state of charge of said power storage device is higher than a threshold value.

6. The vehicle according to claim 1, wherein
said predetermined condition includes a condition that a temperature of said power storage device is lower than a threshold value.

7. The vehicle according to claim 1, wherein
said predetermined condition includes a condition that a charge duration time of said power storage device exceeds a prescribed time.

8. The vehicle according to claim 1, wherein
said vehicle further includes a second rotating electric machine of which rotation shaft is coupled to said drive shaft, and
said control unit controls said second rotating electric machine such that reaction force against said torque of said first rotating electric machine is generated, when said stop command has been received at said input unit while said vehicle is traveling, and when said predetermined condition is satisfied.

9. The vehicle according to claim 1, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

10. The vehicle according to claim 2, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

11. The vehicle according to claim 3, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

12. The vehicle according to claim 4, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

13. The vehicle according to claim 5, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

14. The vehicle according to claim 6, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

15. The vehicle according to claim 7, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

16. The vehicle according to claim 8, wherein
said power transmission device is a planetary gear mechanism having a sun gear, a pinion gear, a carrier, and a ring gear,
said sun gear is coupled to said rotation shaft of said first rotating electric machine,
said carrier is coupled to said output shaft of said internal combustion engine, and
said ring gear is coupled to said drive shaft.

17. A control method for a vehicle used in a vehicle including a drive shaft for causing a drive wheel to rotate, an internal combustion engine, a rotating electric machine a power storage device for supplying and receiving power to and from said rotating electric machine, and a power transmission device mechanically coupling three elements, which are said drive shaft, an output shaft of said internal combustion engine, and a rotation shaft of said rotating electric machine, said power transmission device utilizing any one of said three elements as a reaction force element, thereby allowing for transmission of motive power between the other two elements, said control method comprising the steps of:

determining whether a stop command for a system of said vehicle has been received from a driver or not; and controlling said vehicle such that torque of said rotating electric machine is transmitted to said output shaft of said internal combustion engine, by supplying electric power from said power storage device to said first rotating electric machine, when said stop command has been received while said vehicle is traveling, and when a predetermined condition in which input power is restricted in said power storage device is satisfied.

* * * * *